(12) United States Patent
Breed et al.

(10) Patent No.: US 8,731,530 B1
(45) Date of Patent: May 20, 2014

(54) IN-VEHICLE DRIVER CELL PHONE DETECTOR

(71) Applicant: Intelligent Technologies International, Inc., Boonton, NJ (US)

(72) Inventors: David S. Breed, Miami Beach, FL (US); Wilbur E DuVall, Branson West, MO (US)

(73) Assignee: Intelligent Technologies International, Inc., Boonton, NJ (US)

( * ) Notice: Subject to any disclaimer, the term of this patent is extended or adjusted under 35 U.S.C. 154(b) by 0 days.

(21) Appl. No.: 13/780,303

(22) Filed: Feb. 28, 2013

Related U.S. Application Data

(60) Provisional application No. 61/638,614, filed on Apr. 26, 2012.

(51) Int. Cl.
*H04M 3/42* (2006.01)

(52) U.S. Cl.
USPC .................................................. 455/414.1

(58) Field of Classification Search
USPC .................................................. 455/414.1
See application file for complete search history.

(56) References Cited

U.S. PATENT DOCUMENTS

| | | | |
|---|---|---|---|
| 6,580,915 B1 | 6/2003 | Kroll | |
| 6,687,497 B1 | 2/2004 | Parvulescu et al. | |
| 6,690,956 B2 | 2/2004 | Chua et al. | |
| 6,701,158 B2 | 3/2004 | Moreth | |
| 6,961,561 B2 | 11/2005 | Himmel et al. | |
| 6,973,333 B1 | 12/2005 | O'Neil | |
| 7,006,793 B2 | 2/2006 | Himmel et al. | |
| 7,181,229 B2 | 2/2007 | Singh et al. | |
| 7,343,148 B1 | 3/2008 | O'Neil | |
| 7,471,929 B2 | 12/2008 | Fujioka et al. | |
| 7,565,230 B2* | 7/2009 | Gardner et al. | 701/32.7 |
| 7,646,312 B2 | 1/2010 | Rosen | |
| 7,697,917 B2 | 4/2010 | Camp, Jr. et al. | |
| 7,738,831 B2 | 6/2010 | Nath et al. | |
| 7,873,374 B1 | 1/2011 | O'Neil | |
| 7,876,205 B2 | 1/2011 | Catten et al. | |
| 7,957,773 B2* | 6/2011 | Chua et al. | 455/569.2 |
| 7,966,025 B1 | 6/2011 | O'Neil | |
| 8,064,926 B2 | 11/2011 | Howarter et al. | |
| 8,090,399 B2 | 1/2012 | Howarter et al. | |

(Continued)

OTHER PUBLICATIONS

Signal Safe, Driver Cell Phone Detection System, at signal-safe.com/howitworks.html, accessed on or before Aug. 19, 2012.

(Continued)

*Primary Examiner* — Nathan Mitchell
(74) *Attorney, Agent, or Firm* — Brian Roffe

(57) ABSTRACT

System and method for monitoring emissions from a cell phone in a vehicle having a driver side and a passenger side. A first directional antennas is aimed toward the passenger side, a second directional antennas is aimed toward a location in which a head of a driver would be situated when a driver is situated on the driver side, and a third directional antenna is aimed toward a location below the location at which the second antennas is aimed on the driver side. A receiver is associated with each antenna and includes at least one amplifier and a rectifier module that converting radio frequency signals to direct current signals. A microprocessor processes the direct current signals received and determines based thereon which antenna provides a strongest signal, which can be correlated to a most likely location of a cell phone being used by an occupant in the vehicle.

20 Claims, 4 Drawing Sheets

(56) References Cited

U.S. PATENT DOCUMENTS

| | | | |
|---|---|---|---|
| 8,126,389 B2 | 2/2012 | Brown et al. | |
| 8,145,199 B2 | 3/2012 | Tadayon et al. | |
| 8,200,291 B2 | 6/2012 | Steinmetz et al. | |
| 8,461,973 B2* | 6/2013 | Reed et al. | 340/425.5 |
| 2002/0003450 A1* | 1/2002 | Pearson et al. | 329/350 |
| 2006/0284769 A1* | 12/2006 | Bolduc et al. | 342/463 |
| 2008/0064446 A1* | 3/2008 | Camp et al. | 455/565 |
| 2008/0154438 A1* | 6/2008 | Kalik | 701/1 |
| 2009/0029675 A1* | 1/2009 | Steinmetz et al. | 455/410 |
| 2009/0085728 A1* | 4/2009 | Catten et al. | 340/425.5 |
| 2010/0035632 A1* | 2/2010 | Catten | 455/456.1 |
| 2011/0207448 A1* | 8/2011 | Chen et al. | 455/418 |
| 2011/0237219 A1* | 9/2011 | Mendenhall et al. | 455/405 |
| 2011/0300843 A1* | 12/2011 | Miller et al. | 455/418 |
| 2012/0015625 A1* | 1/2012 | Mendenhall et al. | 455/405 |

OTHER PUBLICATIONS

In-Vehicle Driver Detection Using Mobile Phone Sensors, Project Report by Hon Lung Chu, Apr. 20, 2011.

Jammers fFactory, at http://www.cellphone-jammer.org/handheld-gps-cell-phone-jammer-akj008-p-290.html?zenid=nfqjfjoattrfruch2poniitfr7, accessed on or before Aug. 19, 2012.

Cell Phone and RF Detection Systems, at http://www.eeontheweb.com/cell_phone_detectors.htm, accessed on or before Aug. 19, 2012.

CellAntenna Introduces Cell Phone Detection System to Prevent Passenger Train and Public Transportation Accidents, at http://eon.businesswire.com/news/eon/20100526005358/en/cell-phone-control/CellAntenna/CJAM-TrainAlert, accessed on or before Aug. 19, 2012.

TransitHound Cell Phone Detector, at http://bvsystems.com/Products/Security/TransitHound/transithound.htm, accessed on or before Aug. 19, 2012.

Trinity Guardian Angel, at http://www.trinitynoble.com/guardian_angel_mobile_platform.html, accessed on or before Feb. 28, 2013.

New device makes texting while driving impossible, by Sarah Korones, Jul. 15, 2012.

App Battles Driver Distraction but Spares Passengers; A new approach detects when a driver is using a phone to inhibit dangerous phone use, Feb. 14, 2012, by David Talbot.

In-Vehicle Driver Detection Using Mobile Phone Sensors, by Jeffrey (Shih-kai) Shen, accepted for ACM MobiSys Jun. 2011 Poster.

Detecting Driver Phone Use Leveraging Car Speakers, Jie Yang et al., Mobicom 11, Sep. 19-23, 2011, Las Vegas, Nevada, USA.

Abstract of KR 100251143 B1, May 1, 2000.

* cited by examiner

IN-VEHICLE DRIVER CELL PHONE DETECTOR

CROSS-REFERENCE TO RELATED APPLICATION

This application claims priority under 35 U.S.C. §119(e) of U.S. provisional patent application Ser. No. 61/638,614 filed Apr. 26, 2012, now expired, which is incorporated by reference herein.

FIELD OF THE INVENTION

The present invention relates generally to systems and methods for monitoring cell phone usage in a vehicle, and more particularly to a system and method for determining whether a cell phone is being used by a driver or operator of the vehicle for texting or talking.

BACKGROUND OF THE INVENTION

Thirty-one US states have enacted laws that ban texting during motion of a vehicle and nine states have enacted laws that ban the use of cell phones during motion of a vehicle and other similar telecommunications devices (collectively referred to herein as cell phones), completely causing automakers to try to develop a user interface solution that will bring drivers the information they want and allow some form of cell phone usage during motion of a vehicle. Until automakers create such a user interface, a need exists for apparatus and methods for determining whether a driver of a vehicle is violating these laws and if so, to take an action such as issuing a warning to the driver and/or others.

In this regard, Korean Patent Publication No. KR100251143(B1) describes a safety driving device to automatically decelerate a vehicle while a driver is talking over a cellular phone and to operate an alarm lamp and a buzzer to warn the driver.

SUMMARY OF THE INVENTION

This invention presents at least two solutions to the need described above, as well as additional or alternative needs mentioned below or that will be appreciated by those skilled in the art upon review of the disclosure herein. A first solution involves apparatus mounted on the vehicle and a second solution involves modifications to the cell phone itself.

For the vehicle-mounted embodiment, a device is mounted on an instrument panel, and/or other appropriate location, which is capable of detecting transmissions from cell phones. In a preferred implementation, three directional antennas are provided along with appropriate circuitry to determine a direction from which the cell phone radiation is emitted. One antenna is directed toward the passenger seat and two antennas are directed toward the driver's seat. One of the antennas which is pointed toward the driver's seat is aimed toward the probable location of a head of the driver and the second antenna is pointed toward a lower location. By comparing or otherwise analyzing transmissions from the passenger and driver antennas, a conclusion can be obtained as to whether it is the driver or passenger who is using the cell phone. If the transmission is coming from the driver's side, a comparison of the upper and lower pointed antennas can determine whether the driver is using a hands-free device or is holding the cell phone to his/her ear. Alternately, the driver's antennas, or other special antenna, can also sense for a Bluetooth transmission indicating that a wireless hands-free device is in use.

If the transmission is coming from the lower portion of the driver's seat, the signal can be further analyzed to determine whether the signal is indicative of an audio or texting transmission.

A determination that the vehicle is in motion, i.e., to assess violation of laws banning use of a cell phone by a driver during vehicle motion, can be accomplished in a variety of ways. These include an inertial sensor such as an accelerometer located within the cell phone or the vehicle, as appropriate, with appropriate circuitry that ascertains that output of the accelerometer is indicative of vehicle motion. Other motion determining sensors include a GPS receiver, speedometer, odometer and wheel speed sensor.

If the apparatus described above determines that the driver is either using a handheld cell phone or is texting and the vehicle is in motion, then a warning, or other action, can be issued or initiated to alert the driver, for example, or others that he/she is violating the law.

For the cell phone-based embodiment, vehicle motion can be determined by a cell phone-resident GPS receiver and appropriate software. A Bluetooth connection or equivalent can be used to determine hands-free operation. If it has been determined by the cell phone that the vehicle is in motion and a hands-free device is not active, then a determination can be made as to whether it is the driver or some other vehicle occupant that is using the cell phone. This can be accomplished, for example, by listening for more than one distinctive voice in the vehicle. If no other voices are readily apparent, the phone operator can be prompted to ask others in the vehicle to speak for this determination, if necessary. For the purposes of some embodiments of this invention, it can be assumed that if there are two or more people in the vehicle that it is someone other than the driver who is operating the cell phone.

Another approach is to check for transmissions from a second cell phone. Since the cell phone system periodically polls cell phones to determine whether they are connected to the system, all cell phones periodically emit a signal. If more than one cell phone is present in the vehicle, then the assumption can be made that it is the passenger who is operating the cell phone, rather than the driver. If the above approaches fail, then the phone operator can be requested to take an image of the driver and pattern recognition technology resident within the cell phone can determine that someone other than the driver is taking the picture and thus is present in the vehicle.

BRIEF DESCRIPTION OF THE DRAWINGS

The following drawings are illustrative of embodiments of the system developed or adapted using the teachings of at least one of the embodiments of the invention disclosed herein and are not meant to limit the scope of the invention as encompassed by the claims.

DETAILED DESCRIPTION OF THE INVENTION

Referring to the accompanying drawings wherein the same reference numbers refer to the same or similar elements, a method and system will be described to detect whether a driver of a vehicle is using a cell phone and the nature of transmissions from the cell phone with reference to a motor vehicle that travels on land, such as an automobile, and has a driver side and a passenger side. Although reference is made to the driver of a vehicle herein, the invention is applicable equally to any type of vehicle with an operator that controls the vehicle or an implement thereof, whether present in the vehicle or operating the vehicle from a location apart from the vehicle. Thus, the method and system in accordance with the invention are not limited to automobiles and can be applied with any vehicle, whether travelling on land (trains, trucks, buses, etc.), in the air (airplanes, helicopters, etc.) or on water (boats, ships, etc.).

Figure 1:
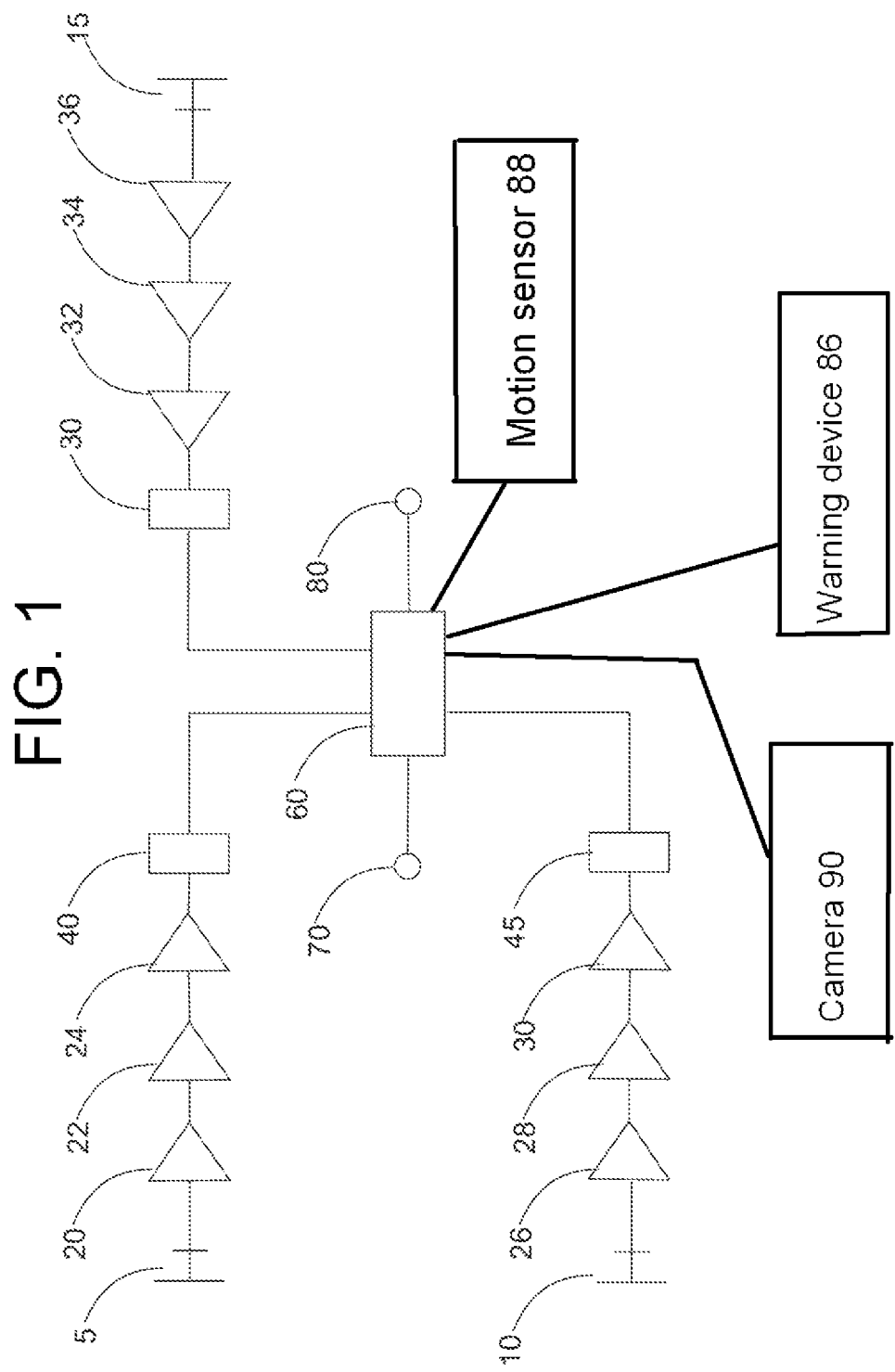
FIG. 1 illustrates a circuit that can be used to detect emissions from a cell phone and to determine the nature of the transmission.

A first schematic of a circuit that can be used to detect emissions from a cell phone and to determine the nature of the transmission is illustrated in FIG. 1. The circuit includes a plurality of directional antennas, e.g., three directional antennas 5, 10 and 15. Antennas 5, 10, 15 may be Yagi antennas or other functionally or operatively comparable antennas. Antennas 5 and 10 are for the driver side of the vehicle and antenna 15 is for the passenger side.

There are three identical receivers each comprising amplifiers 20, 22, 24 associated with directional antenna 5 and amplifiers 26, 28, 30 associated with directional antenna 10 for the driver side and amplifiers 32, 34, 36 associated with directional antenna 15 for the passenger's side. A different number of amplifiers may be provided in each receiver.

The amplifiers 20, 22, 24, 26, 28, 30, 32, 34, 36 are all preferably radio frequency amplifier modules available commercially (although not necessarily all the same). The receivers also comprise rectifier modules 40 and 45 for the driver side, following amplifiers 24 and 30, respectively, and rectifier module 50 for the passenger side, following amplifier 32. The rectifier modules 40, 45, 50 convert the radio frequency signals to direct current (DC) which is digitized by a microprocessor 60. A single microprocessor 60 as shown can process all of the DC converted signals, although multiple microprocessors may be used if so desired.

Amplitude comparisons are made by the microprocessor 60 to determine which signal, i.e., the one obtained from rectifier module 40, the one obtained from rectifier module 45 or the one obtained from rectifier module 50, is stronger thereby determining the most likely cell phone location whether on the passenger or driver side of the vehicle and, if on the driver side, whether the signal is coming from the driver's head or seat area. This latter determination may be facilitated by the different positions and/or orientations of antennas 5 and 10, one of the antennas is aimed toward the probable location of a head of the driver and the second antenna is pointed toward a lower location.

All of the components in FIG. 1, except the antennas, motion sensor 88, warning device 86 and camera 90, can be located on one integrated circuit, although location on multiple integrated circuits is also a possibility. A driver phone is indicated generally as 70 and a passenger phone as 80 in FIG. 1.

Since both of the driver's side antennas 5, 10 point at the driver, the signal from the driver side will be greater than the signal from the passenger's side when the cell phone 70 is used by the driver. Conversely, if the cell phone 80 is being used by the passenger, the signal from the passenger's receiver will be larger than the signal from both of the driver's receivers. Similarly for the driver side, if the signal from the head-pointed antenna 5 is larger than the signal from the seat-pointed antenna 10, then the driver is probably using a hand held cell phone 70.

Figure 2:
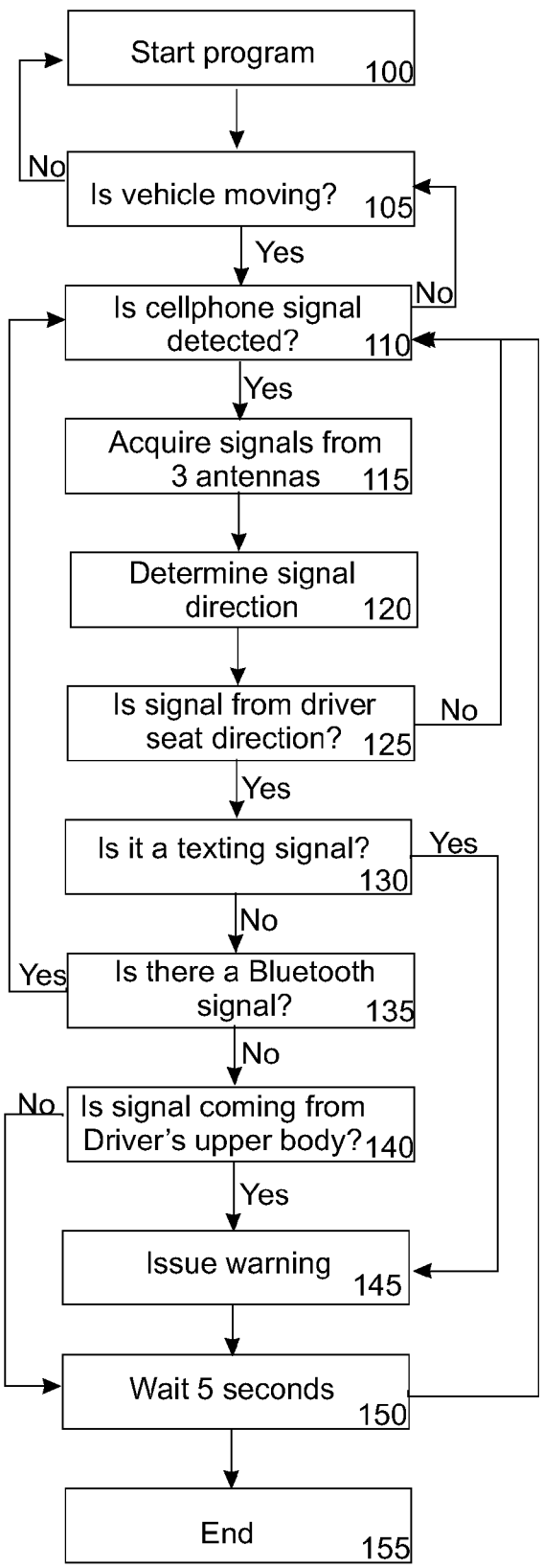
FIG. 2 is a flow chart illustrating the determination that a driver of a vehicle is texting or talking on a hand held cell phone while driving using a vehicle-based system.

A flow chart illustrating an exemplifying, non-limiting determination that the driver is texting using a handheld cell phone 70 or talking on a handheld cell phone 70 while driving using a vehicle-based system is illustrated in FIG. 2.

On vehicle start up, the program is initiated at 100. The first task at 105 is to determine whether the vehicle is moving, because use of a cell phone for talking or texting while the vehicle is stopped is usually not banned by the states.

Vehicle motion can be determined by a connection to one of a variety of vehicle-mounted sensors such as a GPS receiver with appropriate circuitry and software, the speedometer, the odometer, a wheel speed sensor, or other vehicle-resident sensor which can determine vehicle motion along with appropriate circuitry and software to make this information available and useful. Such sensors may be permanently mounted in the vehicle, e.g., installed when the vehicle is assembled, and not removable therefrom. Such sensors may also be part of other components of the vehicle. An exemplifying vehicle motion sensor is depicted schematically in FIG. 1 as element 88, shown connected to the microprocessor 60.

If the vehicle is not moving, then the program remains in a loop until vehicle motion is detected.

If the vehicle is moving, then the circuit of FIG. 1 is operated to determine whether there is a cell phone signal detected from anywhere within the vehicle. Alternatively, a cell phone detection from the driver's side directional antennas 5, 10 is only considered. However, since the driver's side antennas 5, 10 will detect any cell phone signal from anywhere in the vehicle, consideration must also be given to receptions from the passenger side antenna 15. Signals from the three antennas 5, 10, 15 are therefore collected in step 115.

The circuitry of FIG. 1 then determines the direction of the cell phone signal at step 120. By comparing the signals from the driver and passenger sides, a determination is made in step 125 whether the signal is coming from the driver seat direction. If the signal is not emanating from the driver seat direction, then control is returned to step 110.

If the signal is determined to be coming from the driver's seat direction in step 125, then further analysis is performed in step 130 to determine whether the signal is indicative of a texting signal or of a voice signal. This can be done by one skilled in the art through one or more of a variety of pattern recognition algorithms including, for example, a trained neural network in the microprocessor 60. If a texting signal is detected, then control is transferred to step 145 and a warning message is issued by means of a warning generating device 86 coupled to the microprocessor 60.

If it is determined that the signal is a voice signal, then the antennas of FIG. 1 are again used, or an alternate antenna is used for this purpose, to determine whether a Bluetooth signal is present indicative of the use of a hands-free device in step 135. This determination is representative of a variety of methods by which the vehicle driver may be operating his cell phone 70 in a hands-free manner.

In some vehicles, there is a connection between the cell phone and the vehicle entertainment system either by Bluetooth or equivalent wireless technology or, in some cases, by a wired connection. In other cases, the driver is wearing an ear mounted speaker and microphone which is connected directly wirelessly to the cell phone 70. Any of these connections are determined in step 135.

If there is a Bluetooth signal, control returns to step 110.

There are of course other methods by which hands-free cell phone operation can take place. For example, there can be a wired connection between ear buds and an adjacent microphone to the cell phone permitting the driver to conduct a conversation in a hands-free manner. For this situation, when there is no Bluetooth signal detected in step 13, a determination is made in step 140 as to whether the signal is coming from the head region of the driver or a lower location. If the analysis described in FIG. 1 description indicates that the direction of the cell phone signal is from the upper body of the driver, then control is transferred to step 145 and again a warning is issued via a warning device coupled to the microprocessor 60. If it is determined that the signal is not coming from the driver's upper body region, then control is transferred to a waiting step 150 and a period of time such as 5 seconds is allowed to lapse before the control is transferred back to step 110 and the cycle repeated.

There are of course other means of determining whether the driver is using a handheld cell phone. For example, a vehicle resident camera which monitors the driver can be used to determine whether the driver is engaging in handheld cell phone operation (and such a vehicle-resident camera 90 is depicted in FIG. 1 coupled to the microprocessor 60). This possibility along with any other method of determining handheld cell phone use is meant to be equivalent to the determination described in step 140.

The nature of the warning issued in step 145 by the warning device 86 can vary depending on the prevailing law in the state or region and on preferences of the vehicle designer, manufacturer and/or operator. The warning can be generated by a warning generating device and can take the form of a simple audio and/or visual warning such as a light on the dashboard, a buzzer, a notice on the heads-up and/or other display visible to the driver, etc. Alternatively, a message in the form of blinking headlights or hazard lights can be communicated visually outside of the vehicle. Similarly, a sounding of a repetitive horn signal can be used. Furthermore, if permitted by local laws, a message can be sent from the vehicle electronically via a communications device to a remote location which can use or be the Internet, a cell phone SMS text message, recorded verbal cell phone message, or other message sent for example to local authorities. Multiple and different warning devices may be used and each activated for the same or different situations.

In some emergency situations, it may be necessary or desirable for a driver to engage in a handheld cell phone conversation while driving and this possibility must be taken into account so as not to jam, for example, the driver's cell phone signal preventing him/her from making such a call under all circumstances.

Another form of a warning message can be sent over the cell phone to the recipient of the call as well as or alternatively to the driver.

Apparatus and methods implementing the control technique shown in FIG. 2 require installation on the vehicle either when the vehicle is manufactured or as a retrofit. An alternate solution is to configure a cell phone, or smart phone, to provide this function.

Figure 3:
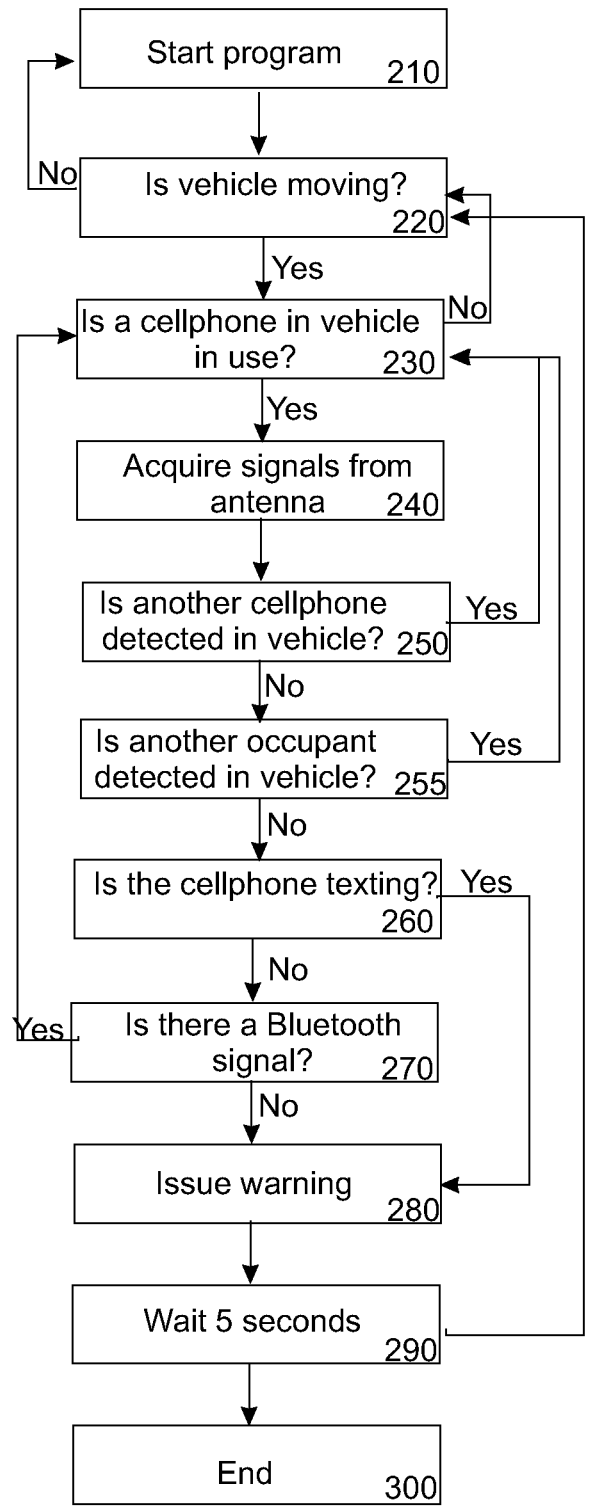
FIG. 3 is a flow chart illustrating the determination that the person operating the cell phone is a passenger of the vehicle using a cell phone based system.

A flow chart illustrating an exemplifying, non-limiting determination that a person operating the cell phone is a passenger using a cell phone-based system is illustrated in FIG. 3. The program starts when the cell phone is activated at step 210. As in the previous application, the next step 220 is to determine whether the vehicle is moving. Since the cell phone generally does not have access to vehicle-mounted sensors, it must use its own GPS receiver or inertial sensor(s) to satisfy this function. In addition to determining whether there is any motion, the cell phone must determine that this motion is representative of a vehicle being driven as opposed to a walking pedestrian. These determinations are made in step 220 and if the result is a conclusion that the vehicle is not moving, control is passed back to the program initiation, step 210.

The next step 230 is to determine whether the cell phone which comprises this apparatus is in use. If the cell phone is not being used, control is transferred back to step 220. If the cell phone is in use, then the next step 240 is invoked which comprises an antenna, which may be the primary cell phone antenna, which is operated in a fashion as to listen for cell phone signals from other cell phones in the vehicle. Once these signals have been obtained, a determination can be made whether there is another cell phone detected in the vehicle, step 250. Since cell phones periodically communicate with the closest cell phone tower even when the cell phones are not in use, this task is capable of determining whether other cell phones are present in the vehicle.

If another cell phone is detected in the vehicle in step 250, then the assumption is made that there are more than two occupants of the vehicle and in such a case, it is deemed unlikely that the driver is operating the cell phone and thus it is assumed that the cell phone in use is being operated by a vehicle passenger and control is returned to step 230.

On the other hand, if a second cell phone is not determined to be present in the vehicle then control is passed to step 255 which determines by some other means whether there is another vehicle occupant. This can be done by, for example, listening for multiple voices using the cell phone microphone and, if no other occupants are detected in step 255, the user can be requested to ask other occupants to talk for this purpose. If that fails, the cell phone camera can be used with pattern recognition technology to indicate that the person using the cell phone is not the driver.

If a second occupant is not detected in step 255 by any of these means, control is passed to step 260 which determines whether the cell phone is operating in a texting mode as described under the description of FIG. 2. If texting is detected, then control is passed to step 280 where a warning is issued.

If the cell phone is not determined to be used for texting in step 260, then a determination is made within the cell phone whether a hands-free apparatus such as a wireless Bluetooth headset or wired headset is in use, step 270. This can be done based on the information available within the cell phone. If such hands-free operation is detected, then control is returned to step 230 and, if not, control is sent to step 280 and a warning is issued as above. After the warning is issued, control is passed to step 290, which is a delay task for some time such as about 5 seconds to allow the driver to terminate the cell phone conversation. Following this delay, control is returned to step 220 and the cycle repeated.

In another embodiment of the invention, it may be desired to monitor only the driver side of the vehicle, In this case, the circuit would include two or more directional antennas, all aimed toward a different portion of the area in which the driver would be seated on the vehicle seat when present therein or thereon. For example, as noted above, one antenna may be aimed toward the driver's head and another antenna aimed toward a lower location, e.g., the driver's torso or legs. Each antenna provides output to three amplifiers followed by a rectifier module. A microprocessor receives the output from the rectifier modules and analyzes the output signals to determine which signal is stronger thereby determining the most likely cell phone location whether the signal is coming from the driver's head or seat area.

In the embodiments described above, directional antennas are used to determine where a signal is coming. There are other techniques to determine the source of a signal, which may be used as an alternative to directional antennas, and all such techniques including directional antennas will be referred to as means for determining a source of a signal.

Figure 4:
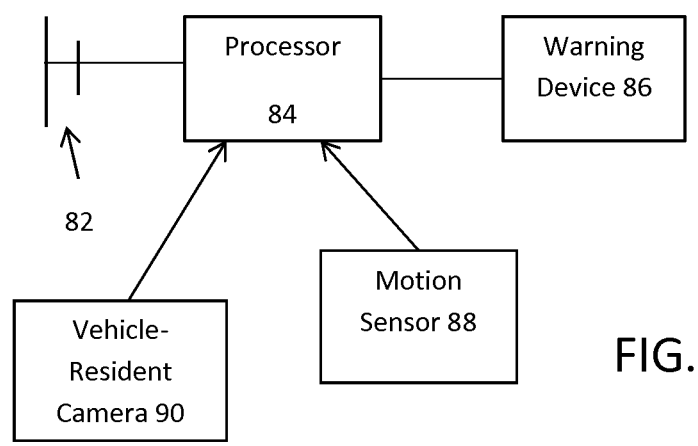
FIG. 4 illustrates an embodiment wherein a single antenna is used to determine the position of a cell phone.

FIG. 4 shows one such alternative wherein a single antenna 82 is provided. This antenna 82 is positioned to be able to detect or receive transmissions from at least a cell phone when used by a driver of a vehicle and a cell phone when used by a front seated passenger of the vehicle. Although one antenna 82 is depicted, multiple antennas may be used. Each of the multiple antennas may be used to independently determine the location or source of the transmissions and then the results combined to improve the accuracy of the cell phone detection process.

Processor 84 is configured, possibly in combination with software and hardware in a manner known to those skilled in the art, to compare the phase of signals arriving at the antenna 82 to assess a phase shift of such signals. This phase shift may be correlated to length or distance of travel of the signal, often based on its transmission characteristics, and thus a longer path length can be used to determine the distance to the source of the signals. If the receiving antenna 82 is close to the driver, i.e., mounted on the door on the driver's side of the vehicle, then a relatively long signal path length would be indicative of the source of the signals being the passenger's cell phone whereas a relatively short signal path length would be indicative of the source of the signals being the driver's cell phone (the signal path length being derivable from the phase shift of signals transmitted and received by the antenna 82). Conversely, if the receiving antenna is close to the passenger, i.e., mounted on the door on the passenger's side of the vehicle, then a relatively long signal path length would be indicative of the source of the signals being the driver's cell phone whereas a relatively short signal path length would be indicative of the source of the signals being the passenger's cell phone.

In one embodiment, the antenna 82 may be mounted on, incorporated into or arranged on the A-pillar of a vehicle, on either the driver's side or the passenger's side. With only one such antenna 82 on the vehicle, the processor 84 could be configured to analyze phase shift measurements derived from received signals and distinguish between a driver's use of a cell phone and a passenger's use of a cell phone.

Appropriate positioning of the antenna 82, and processing of the phase shift by the processor 84, may also be used to determine whether the cell phone is being used in a handheld or hands-free manner. Again, positioning the antenna 82 on the A-pillar of a vehicle could enable the processor 84 to make this determination since the distances obtained from phase shift measurements would be different for a passenger's use of a cell phone, a driver's use of a hands-free cell phone and a driver's use of a handheld cell phone.

After the determination by the processor 84, commands may be directed to the warning device 86, as described above. Further, the processor 84 optionally receives input from the vehicle-motion sensor 88 and the vehicle-resident camera 90 (both of which are described above) to effect the method depicted by the flow chart in FIG. 3.

Issuance of a warning by the warning device 86 in accordance with the invention is a preferred embodiment, instead of terminating the transmission or blocking the transmission. As such, an embodiment of the invention can be designed to lack any such transmission termination or blockage technique and capability. This may be useful because there are times in an emergency where cell phone use by the driver should be permitted. A system that automatically terminates or blocks a transmission from a driver's cell phone therefore may unfortunately terminate or block such an emergency call. Design of an embodiment of the invention without the capability of terminating or blocking a call, and with the ability to issue a warning, inherently avoids such unfortunate occurrences.

Although several preferred embodiments are illustrated and described above, there are possible combinations using other geometries, sensors, materials and different dimensions for the components that perform the same functions. At least one of the embodiments of the invention disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

We claim:

1. A system for monitoring emissions from a cell phone in a vehicle having a driver side and a passenger side, comprising:
   a plurality of directional antennas, a first one of said antennas being aimed toward the passenger side, a second one of said antennas being aimed toward a location in which a head of a driver would be situated when a driver is situated on the driver side, and a third one of said antennas being aimed toward a location below the location at which the second antennas is aimed on the driver side;
   a receiver associated with each of said antennas, each receiver comprising at least one amplifier and a rectifier module receiving output from said at least one amplifier, each of said rectifier modules converting radio frequency signals to direct current signals; and
   a microprocessor for digitizing the direct current signals received from said receivers and determining based thereon a most likely location of a cell phone being used by an occupant in the vehicle.

2. The system of claim 1, wherein:
   at least one of said receivers comprises three amplifiers; and
   at least one of said amplifiers is a radio frequency amplifier module.

3. The system of claim 1, wherein said microprocessor is configured to determine the most likely location of the cell phone by determining which of said first, second and third antennas provides a strongest signal, said microprocessor determining which of said first, second and third antennas provides a strongest signal by comparing amplitudes of the direct current signals from said rectifier modules.

4. The system of claim 1, further comprising:
   a sensor system that determines whether the vehicle is in motion, said microprocessor being further configured to determine, when the vehicle is determined to be in motion by said sensor system, whether the cell phone is being used for texting.

5. The system of claim 4, wherein said microprocessor is further configured to cause a warning to be generated when the cell phone is being used for texting.

6. The system of claim 4, wherein said microprocessor is further configured to determine, when the vehicle is determined to be in motion by said sensor system and the cell phone is determined not to be used for texting, whether a wireless communication protocol is being used by the cell phone.

7. The system of claim 1, further comprising:
a sensor system that determines whether the vehicle is in motion,
said microprocessor being further configured to determine, when the vehicle is determined to be in motion by said sensor system and the strongest signal is detected from said second or third antenna, whether a wireless communication protocol is being used by the cell phone,
said microprocessor being further configured to determine, when the vehicle is determined to be in motion and a wireless communication protocol is not determined to be used by the cell phone, whether the strongest signal is detected from said second antenna,
said microprocessor being further configured to cause a warning to be generated when a wireless communication protocol is not determined to be used by the cell phone and the strongest signal is detected from said second antenna.

8. The system of claim 1, further comprising:
a sensor system that determines whether the vehicle is in motion,
said microprocessor being further configured to determine, when the vehicle is determined to be in motion by said sensor system, whether an additional cell phone is present in the vehicle.

9. The system of claim 8, wherein said microprocessor is further configured to determine, when no additional cell phone is determined to be present in the vehicle and the vehicle is determined to be in motion, whether an additional occupant is present in the vehicle,
said microprocessor being further configured to determine, when no additional cell phone and occupant are determined to be present in the vehicle and the vehicle is determined to be in motion, whether the cell phone is being used for texting,
said microprocessor being further configured to cause a warning to be generated when the cell phone is being used for texting, said microprocessor being further configured to determine, when no additional cell phone and occupant are determined to be present in the vehicle, the vehicle is determined to be in motion and the cell phone is determined not to be used for texting, whether a wireless communication protocol is being used by the cell phone,
said microprocessor being further configured to cause a warning to be generated when no additional cell phone and occupant are determined to be present in the vehicle, the vehicle is determined to be in motion, the cell phone is determined not to be used for texting and a wireless communication protocol is not determined to be used by the cell phone.

10. The system of claim 1, further comprising:
a sensor system that determines whether the vehicle is in motion; and
a warning device that activates a warning when said second or third antenna provides a strongest signal.

11. The system of claim 10, wherein said warning device is configured to activate the warning when:
said second antenna provides a strongest signal and the cell phone is determined to be used for talking without using a wireless communication protocol;
when said second or third antenna provides a strongest signal and the cell phone is determined to be used for texting; when the cell phone is determined to be used for texting and no other cell phone or occupant is determined to be present in the vehicle; and
when the cell phone is determined to be used for talking without using a wireless communication protocol and no other cell phone or occupant is determined to be present in the vehicle.

12. A method for monitoring emissions from a cell phone in a vehicle having a driver side and a passenger side, comprising:
obtaining a first signal originating from a first directional antenna aimed toward the passenger side and passing through a receiver comprising at least one amplifier and a rectifier module that converts radio frequency signals from the at least one amplifier to direct current signals;
obtaining a second signal originating from a second directional antenna aimed toward a location in which a head of a driver would be situated when a driver is situated on the driver side and passing through a receiver comprising at least one amplifier and a rectifier module that converts radio frequency signals from the at least one amplifier to direct current signals;
obtaining a third signal originating from a third directional antenna aimed toward a location below the location at which the second antenna is aimed on the driver side and passing through a receiver comprising at least one amplifier and a rectifier module that converts radio frequency signals from the at least one amplifier to direct current signals;
digitizing the direct current signals received from the receivers;
determining based on the digitized direct current signals which of the first, second and third antennas provides a strongest signal; and
correlating the determination of which of the first, second and third antennas provides a strongest signal to a most likely location of a cell phone being used by an occupant in the vehicle.

13. The method of claim 12, wherein the step of determining which of the first, second and third antennas provides a strongest signal comprises comparing amplitudes of the direct current signals from the receivers.

14. The method of claim 12, further comprising determining whether the vehicle is in motion.

15. The method of claim 14, wherein the step of determining whether the vehicle is in motion comprises:
obtaining output from a vehicle-resident sensor that provides data from which vehicle motion is determinable; or
obtaining output from a cell phone-resident sensor that provides data from which vehicle motion is determinable.

16. The method of claim 12, further comprising:
determining, when the vehicle is in motion and the strongest signal is detected from the second or third antenna, whether the cell phone is being used for texting and generating a warning when the cell phone is being used for texting;
determining, when the vehicle is in motion, the strongest signal is detected from the second or third antenna and the cell phone is determined not to be used for texting, whether a wireless communication protocol is being used by the cell phone;
determining, when the vehicle is in motion, a wireless communication protocol is not determined to be used by the cell phone and the cell phone is determined not to be used for texting, whether the strongest signal is detected from the second antenna; and generating a warning when a wireless communication protocol is not determined to be used by the cell phone, the cell phone is determined not to be used for texting and the strongest signal is detected from the second antenna.

17. The method of claim 12, further comprising:

determining, when the vehicle is in motion and the strongest signal is detected from the second or third antenna, whether a wireless communication protocol is being used by the cell phone;

determining, when the vehicle is in motion and a wireless communication protocol is not determined to be used by the cell phone, whether the strongest signal is detected from the second antenna and generating a warning when a wireless communication protocol is not determined to be used by the cell phone and the strongest signal is detected from the second antenna.

18. The method of claim 12, further comprising:

determining, when the vehicle is in motion, whether an additional cell phone is present in the vehicle by analyzing data from a sensor arranged on the cell phone to determine the presence of the additional cell phone;

determining, when no additional cell phone is determined to be present in the vehicle and the vehicle is in motion, whether an additional occupant is present in the vehicle by analyzing data from a sensor arranged on the cell phone to determine the presence of the additional occupant; and determining, when no additional cell phone and occupant are determined to be present in the vehicle and the vehicle is in motion, whether the cell phone is being used for texting and if so, generating a warning.

19. The method of claim 12, further comprising activating a warning via a warning device when the second or third antenna provides a strongest signal, the warning device being activated:

when the second antenna provides a strongest signal and the cell phone is determined to be used for talking without using a wireless communication protocol, when the second or third antenna provides a strongest signal and the cell phone is determined to be used for texting, when the cell phone is determined to be used for texting and no other cell phone or occupant is determined to be present in the vehicle, and when the cell phone is determined to be used for talking without using a wireless communication protocol and no other cell phone or occupant is determined to be present in the vehicle.

20. A system for monitoring emissions from a cell phone in a vehicle having a driver side and a passenger side, comprising:

a plurality of antennas;

a receiver associated with each of said antennas, each receiver comprising at least one amplifier and a rectifier module receiving output from said at least one amplifier, each of said rectifier modules converting radio frequency signals to direct current signals;

a sensor system that determines whether the vehicle is in motion; and a microprocessor for digitizing the direct current signals received from said receivers and determining based thereon a most likely location of a cell phone being used by an occupant in the vehicle, said microprocessor being further configured to determine, when the vehicle is determined to be in motion by said sensor system, whether an additional cell phone is present in the vehicle, said microprocessor being further configured to determine, when no additional cell phone is determined to be present in the vehicle and the vehicle is determined to be in motion, whether an additional occupant is present in the vehicle, said microprocessor being further configured to determine, when no additional cell phone and occupant are determined to be present in the vehicle and the vehicle is determined to be in motion, whether the cell phone is being used for texting, said microprocessor being further configured to cause a warning to be generated when the cell phone is being used for texting, said microprocessor being further configured to determine, when no additional cell phone and occupant are determined to be present in the vehicle, the vehicle is determined to be in motion and the cell phone is determined not to be used for texting, whether a wireless communication protocol is being used by the cell phone, said microprocessor being further configured to cause a warning to be generated when no additional cell phone and occupant are determined to be present in the vehicle, the vehicle is determined to be in motion, the cell phone is determined not to be used for texting and a wireless communication protocol is not determined to be used by the cell phone.

\* \* \* \* \*